3,403,151
TRIAZINE DERIVATIVES WITH HERBICIDAL
AND FUNGICIDAL PROPERTIES
Enrico Knüsli, Riehen, near Basel, and Jürg Rumpf, Binningen, near Basel, Switzerland, assignors to J. R. Geigy A.-G., Basel, Switzerland
No Drawing. Filed Jan. 31, 1962, Ser. No. 170,263
Claims priority, application Switzerland, Feb. 1, 1961, 1,153/61, 1,154/61
7 Claims. (Cl. 260—249.5)

The present invention relates to new triazine derivatives with herbicidal and fungicidal properties.

2,4-dihalo-6-amino-s-triazines of the general formula

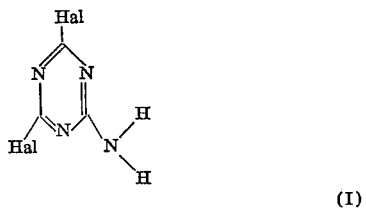

(I)

the amino group of which may possibly be mono- or di-substituted by alkyl or alkenyl groups are already known.

2,4-dihalo-s-triazine derivatives which carry a substituent in the 6-position which is derived from hydroxyamine and its O- and N-substitution products, and 4,6-diamino-s-triazine derivatives, substituted in the 2-position in various ways, in which at least one amino radical is derived from hydroxylamine and its O- and N-substituted products, which therefore have at least one —N—O— linkage, have not previously been known.

It has now been found that s-triazine derivatives of the general formula

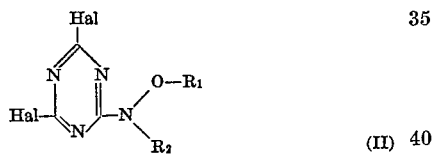

(II)

in which Hal represents halogen atoms such as chlorine, bromine or fluorine, $R_1$ represents a lower saturated or lower unsaturated aliphatic hydrocarbon radical, and $R_2$ represents hydrogen or a lower alkyl or lower alkenyl, preferably hydrogen or lower alkyl radical, possess an excellent fungicidal activity and may also be herbicidally active.

The compounds of the general Formula II are especially distinguished, apart from the moderate herbicidal action, by their very marked fungicidal action.

In Formula II, "lower" means radicals containing 1 to 4 carbon atoms. Generally the two halogen atoms in the 2,4-dihalogen-s-triazines of Formula II are identical and, preferably, both are chlorine atoms. By "saturated or unsaturated aliphatic radicals" in the definition of $R_1$ alkyl, alkenyl and alkynyl radicals, preferably alkyl, are meant. Examples of $R_1$ radicals are methyl, allyl, ethyl, vinyl, ethinyl, propyl, isopropyl, propenyl, propargyl etc. As examples of $R_2$ radicals, there are methyl, ethyl, vinyl, propyl, isopropyl, propenyl etc.

For the preparation of the above-defined new s-triazine derivatives, a cyanuric acid trihalide, such as cyanuric chloride, cyanuric bromide or cyanuric fluoride, is reacted, in the presence of a hydrohalic acid-binding agent, with one mol of a hydroxylamine derivative of the general formula

(IV)

in which $R_1$ and $R_2$ have the meanings given above.

As the agent for binding hydrohalic acid, a molar excess of the hydroxylamine to be reacted or alkali metal hydroxides or carbonates may be employed for this purpose. The reactions may be carried out in an inert organic solvent, e.g. a hydrocarbon or halogenated hydrocarbon of the benzene series, or in aqueous phase.

Suitable starting substances of the general Formula IV are, for example, O-methyl-, O-ethyl-, and O-isopropyl-hydroxylamines, O,N-dimethyl-, O,N-diethyl- and O,N-diisopropyl - hydroxylamines, O - methyl-N-ethyl-hydroxyl-amine etc.

The 2,4 - dihalogen - 6 - amino-s-triazines of the general Formula II as mentioned above, in addition to a rather moderate herbicidal action, have a marked fungicidal activity. They are particularly suitable for the control and prevention of growth of fungi particularly on plants and parts thereof (plant protection). They can also be employed however for the protection of organic materials of all types such as wood, textiles, hides, leather, paper, synthetic materials etc. from attack and decomposition by fungi.

Examples of fungi that may be treated with compounds of Formula II are *Alternaria tenuis, Coniothyrium diplodiella, Clasteriosporium c., Fusarium culmorum, Mucor* spec., *Stemphylium cons.*, Penicillium spec., *Venturia, Plasmopora viticola, Erysiphe polyphaga, Erysiphe graminis* and *Botrytis cinerea*.

The active ingredients according to this first aspect of the invention can be used in known ways, either per se or in combination with conventional agricultural adjuvants, e.g. the usual pulverulent solids, semi-solid (salve-like), liquid or gaseous carriers, diluents, and/or distributing (dispersing) agents. The agricultural adjuvants should be inert to the active ingredients of Formula II.

The fungicidal active substances of general Formula II are used in finely distributed form as such or combined with suitable carriers and distributing agents. They can also be employed in combination with other fungicidal or bactericidal substances such as fungistatica and bacteriostatica. To widen the range of action, the fungicidal active substances for use according to this aspect of the invention can also be combined with insecticidal or nematocidal substances.

To produce fungicidal agents, solid active substances of Formula II can be combined with solid pulverulent carriers such as, e.g. talcum, kaolin, bole, bentonite, chalk or ground limestone. The pulverulent fungicides obtained can be made suspendable in water if desired by the addition of suitable wetting and dispersing agents such as sulphite waste liquor. Also the fungicidal active substances in solid finely ground form can be suspended in water with the aid of surface active agents or, after being dissolved in organic solvents, can be emulsified in water with the aid of suitable emulsifying agents. In addition, these active substances can also be dissolved in organic solvents e.g. in chlorinated hydrocarbons such as trichloroethylene, or in petroleum fractions of medium boiling range, possibly with the addition of auxiliary solvents such as acetone or higher ketones. Finally, the fungicidal active substances can be distributed in the air in the form of aerosols, smoke or mist, this particularly in storerooms and greenhouses.

The fungicidal active substances are applied to the organic material to be protected generally either by mixing therewith, by spraying or by impregnating with organic-aqueous or aqueous-alkaline solutions of the active substances, or by washing, cleaning or rinsing liquors containing the active substance dissolved or dispersed therein. Examples of such organic material to be protected are mainly cellulose fabrics, wood pulp fibres, wood and paper.

The following examples illustrate the preparation of some representative active substances to be used according to the invention as well as typical forms of application and results had. Parts therein represent parts by weight and the temperatures are given in degrees centigrade.

Example 1

43 parts of cyanuric chloride (1 equivalent) are dissolved in 500 parts of benzene. A solution of 11 parts (1 equivalent) of O-methyl-hydroxylamine (methoxyamine) in 300 parts by volume of benzene is dropped into the above solution at 2° to 5°. Then 9.4 parts of NaOH in 100 parts of water are dropped in at 4–5° with stirring. After the mixture has been stirred for a further ten hours at 5° and 3 hours at 20°, the phases are separated and the benzene phase is washed with water. After drying the benzene solution over $Na_2SO_4$, the benzene is distilled off and the solid residue is recrystallised from carbon tetrachloride. The 2,4-dichloro-6-methoxyamino-s-triazine so obtained melts at 152–154°.

Example 2

312 parts of cyanuric chloride (1 equivalent) are dissolved in 4000 parts of benzene and 254 parts (2 equivalents, one of which being in excess for binding the HCl formed) of O-methyl-N-ethyl-hydroxylamine in 400 parts of benzene are dropped in at 3–6°. After the mixture has been stirred for a further 20 hours, at 7°, the benzene solution is washed with ice water, dried with sodium sulphate and the benzene distilled off. The residue is recrystallised from petroleum ether. The 2,4-dichloro-6-(N-methoxy-N-ethylamino)-1,3,5 - triazine so obtained melts at 90–94°.

In a similar way to that described in the above examples, 2,4-dichloro - 6 - isopropoxyamino-s-triazine of melting point 128–130° (from petroleum ether) is obtained by reaction of 1 mol cyanuric chloride with O-isopropyl-hydroxylamine (isopropoxyamine); by reacting cyanuric chloride with one mol of N,O-dimethylhydroxylamine, 2,4-dichloro-6-(N-methoxy-N-methylamino)-1,3,-5-triazine is obtained (M.P. 74–75°) and by reacting cyanuric chloride with one mol of N,O-diethyl-hydroxylamine, 2,4-dichloro-6-(N-ethoxy - N - ethylamino)-1,3,5-triazine is obtained (M.P. 79–82°).

Example 3

2–5 parts of 2,4-dichloro-6-(N-ethoxy-N-ethylamino)-s-triazine are ground with 98–95 parts of talcum. The pulverulent fungicide obtained can be used, for example, for the dusting of plants or parts thereof such as bulbs and tubers. It exerts a very good activity against *Plasmopora viticola* on vine stems and against *Erysiphe polyphaga* on cucumber plants.

Example 4

By grinding together 10 parts of 2,4-dichloro-6-isopropoxyamino-s-triazine and 82 parts of kaolin or chalk and mixing with 8 parts of wetting and dispersing agents, e.g. 5 parts of sulphite waste liquor and 3 parts of ethylene oxide condensation products of alkyl phenols, a concentrate is obtained which, on mixing with water, produces a fungicidal spray which is excellently suitable for the treatment of the parts of plants above ground.

Example 5

50 parts of 2,4-dichloro-6-(N-ethoxy-N-ethylamino)-s-triazine are mixed with 10–15 parts of a protective colloid, e.g. dried sulphite waste liquor, 5–10 parts of an adhesive and, possibly of a wetting agent and 30–35 parts of a pulverulent carrier such as, e.g. kaolin, Champagne chalk or bentonite and the mixture is ground in a Kolloplex mill to a particle size of about 20–30μ. Suspended in a concentration of 0.1 to 0.5% in water, the spray powder obtained is excellently suitable for the control of fungi on parts of plants above ground.

Example 6

Leaves of Windsor beans (*Vicia faba*) are treated with an aqueous suspension containing 0.1 percent of 2,4-dichloro-6-(N - ethoxy - N - ethylamino) - 1,3,5 - triazine. After allowing the leaves to dry, the leaves are infested with an aqueous suspension of the spores of the fungus *Botrytis cinerea*, and stored in a moist chamber at room temperature. After forty-eight hours the infestation has taken place and is estimated on control plants and treated plants. The 2,4 - dichloro - 6 - (N - ethoxy - N - ethylamino)-1,3,5-triazine inhibits the infestation totally (100 percent activity).

What is claimed is:
1. A compound of the formula

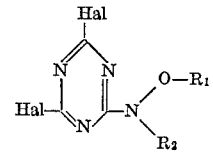

wherein Hal is a halogen
$R_1$ is a member selected from the group consisting of lower alkyl, lower alkenyl and lower alkynyl, and
$R_2$ is a member selected from the group consisting of hydrogen, lower alkyl and lower alkenyl.

2. The compound 2,4-dichloro-6-(N-ethoxy-N-ethylamino)-1,3,5-triazine.

3. The compound 2,4 - dichloro - 6 - methoxyamino - s-triazine.

4. The compound 2,4 - dichloro - 6 - (N - methoxy - N-ethylamino)-1,3,5-triazine.

5. The compound 2,4 - dichloro - 6 - isopropoxyamino-s-triazine.

6. The compound 2,4 - dichloro - 6 - (N - methoxy - N-methylamino)-1,3,5-triazine.

7. A compound of the formula

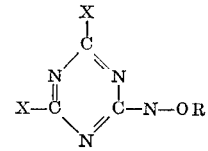

wherein X is selected from the group consisting of fluoro and chloro and R is lower alkyl.

References Cited

UNITED STATES PATENTS

| 2,368,451 | 1/1945 | D'Alelio | 260—249.5 |
| 2,508,323 | 5/1950 | Adams | 260—249.5 |
| 2,720,480 | 10/1955 | Wolf | 167—33 |
| 2,959,519 | 11/1960 | Speziale et al. | 167—33 |
| 2,476,546 | 7/1949 | Hechenbleikner | 260—249.5 |
| 2,728,767 | 12/1955 | Wolf | 260—249.5 |
| 2,891,855 | 6/1959 | Gysin et al. | 71—2.5 |
| 2,923,614 | 12/1960 | Gysin et al. | 71—2.5 |
| 2,658,893 | 11/1953 | Roemer et al. | 260—249.8 |
| 2,996,505 | 8/1961 | Schwarze | 260—249.8 |
| 2,527,314 | 10/1950 | Mackay | 260—249.9 |
| 2,777,848 | 1/1957 | Schaefer | 260—249.9 |

FOREIGN PATENTS 819,520   9/1959   Great Britain.

HENRY R. JILES, *Primary Examiner.*

J. M. FORD, *Assistant Examiner.*